| (12) | United States Patent | (10) Patent No.: | US 9,636,819 B2 |
|---|---|---|---|
| | Lifshitz et al. | (45) Date of Patent: | *May 2, 2017 |

(54) WORK BENCH FRAME

(71) Applicant: THE STANLEY WORKS ISRAEL, LTD., Rosh Ha'Ayin (IL)

(72) Inventors: Omri Lifshitz, Tel Aviv (IL); Miki Birnbaum, Rehovot (IL)

(73) Assignee: THE STANLEY WORKS ISRAEL, LTD., Rosh Ha'Ayin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/151,757

(22) Filed: May 11, 2016

(65) Prior Publication Data

US 2016/0250745 A1    Sep. 1, 2016

Related U.S. Application Data

(63) Continuation of application No. 13/956,494, filed on Aug. 1, 2013, now Pat. No. 9,371,954.

(30) Foreign Application Priority Data

Feb. 15, 2013   (EP) .................................... 13155483

(51) Int. Cl.
| *F16M 11/24* | (2006.01) |
| *B25H 1/04* | (2006.01) |
| *B25H 1/14* | (2006.01) |
| *F16M 11/04* | (2006.01) |
| *F16M 11/16* | (2006.01) |

(Continued)

(52) U.S. Cl.
CPC ............... *B25H 1/04* (2013.01); *A47B 3/002* (2013.01); *B25H 1/14* (2013.01); *F16M 11/04* (2013.01); *F16M 11/16* (2013.01); *F16M 11/38* (2013.01)

(58) Field of Classification Search
None
See application file for complete search history.

(56) References Cited

U.S. PATENT DOCUMENTS 490,603 A    1/1893  Schmidt
742,647 A   10/1903  Herriman
(Continued)

FOREIGN PATENT DOCUMENTS

| CN | 102409436 | 9/2010 |
|---|---|---|
| DE | 3219621 A1 | 12/1983 |

(Continued)

OTHER PUBLICATIONS

European Patent Office, European Search Report for EP Application No. 13155483.4 dated Aug. 22, 2013.

*Primary Examiner* — Monica Millner

(74) *Attorney, Agent, or Firm* — Stephen R. Valancius

(57) ABSTRACT

A work bench including a frame foldable between an in-use position and a closed position. A table surface is connected to the frame. The frame includes two sides, the two sides connected to each other with a latchable bar and one or more fixed crossbars. The work bench also includes movable catch which is movable from a position in which it retains the latchable bar at the latched position to maintain the work bench in an in-use position, and a released position in which the latchable bar is release from the catch to allow the work bench to be folded into a closed position.

17 Claims, 4 Drawing Sheets

(51) Int. Cl.
*A47B 3/00* (2006.01)
*F16M 11/38* (2006.01)

(56) References Cited

U.S. PATENT DOCUMENTS

| | | | |
|---|---|---|---|
| 825,151 A | 7/1906 | McLean | |
| 918,553 A * | 4/1909 | Hoppe | E06C 1/32 |
| | | | 182/175 |
| 970,207 A | 9/1910 | Foster | |
| 1,206,399 A | 11/1916 | Bartlett | |
| 2,800,819 A | 7/1957 | Smith | |
| 3,208,744 A | 9/1965 | Slifer, Jr. | |
| 3,565,417 A | 2/1971 | Degle | |
| 4,127,260 A | 11/1978 | Hickman | |
| 4,155,386 A | 5/1979 | Alessio | |
| 4,159,821 A | 7/1979 | Hickman | |
| 4,278,243 A | 7/1981 | Alessio | |
| 4,291,869 A * | 9/1981 | Hickman | B23D 59/007 |
| | | | 269/139 |
| 4,378,107 A | 3/1983 | Wagster et al. | |
| 4,415,149 A | 11/1983 | Rees | |
| 4,555,099 A | 11/1985 | Hilton | |
| 4,798,371 A | 1/1989 | Wallisser | |
| 4,909,491 A * | 3/1990 | Cheng | B23D 47/025 |
| | | | 269/139 |
| 5,060,920 A | 10/1991 | Engibarov | |
| 5,127,639 A | 7/1992 | Tucker et al. | |
| 5,287,946 A * | 2/1994 | Mayo | E06C 1/18 |
| | | | 182/165 |
| 5,524,872 A | 6/1996 | Lewin et al. | |
| 5,806,947 A | 9/1998 | Meisner et al. | |
| 5,924,684 A | 7/1999 | Cheng | |
| 6,170,813 B1 | 1/2001 | Bowers | |
| 6,196,534 B1 * | 3/2001 | Fortin | B25B 1/103 |
| | | | 269/139 |
| 6,247,771 B1 | 6/2001 | Miller | |
| D448,200 S | 9/2001 | Sagol | |
| 6,299,152 B1 | 10/2001 | Sangmeister | |
| 6,427,804 B1 * | 8/2002 | Lazarus | A47C 7/008 |
| | | | 182/153 |
| 6,578,856 B2 | 6/2003 | Kahle | |
| 6,755,408 B2 | 6/2004 | Walter | |
| 6,817,445 B2 | 11/2004 | Slemmer | |
| 6,830,273 B2 | 12/2004 | Michler et al. | |
| 7,055,847 B2 * | 6/2006 | Miller | B62B 3/022 |
| | | | 248/161 |
| 7,090,210 B2 | 8/2006 | Lawrence et al. | |
| 7,134,652 B2 | 11/2006 | Smith | |
| 7,182,302 B2 | 2/2007 | Noniewicz | |
| 7,213,829 B2 | 5/2007 | Wu | |
| 7,232,120 B2 | 6/2007 | Campbell et al. | |
| 7,328,890 B2 | 2/2008 | Kent | |
| 7,380,778 B2 | 6/2008 | Lawrence et al. | |
| D606,391 S | 12/2009 | Hughes | |
| 7,690,408 B2 | 4/2010 | Sugiura | |
| 7,703,726 B2 | 4/2010 | Harrison et al. | |
| 8,152,149 B2 | 4/2012 | Lawrence et al. | |
| 8,220,786 B2 | 7/2012 | Armstrong et al. | |
| 9,278,446 B2 * | 3/2016 | Lifshitz | B25H 1/02 |
| 2002/0105129 A1 | 8/2002 | Levy | |
| 2004/0208951 A1 | 10/2004 | Bealer | |
| 2004/0250903 A1 * | 12/2004 | Welsh | B25H 1/04 |
| | | | 144/286.5 |
| 2005/0051940 A1 | 3/2005 | Bensman | |
| 2006/0038383 A1 | 2/2006 | Wu | |
| 2007/0018371 A1 | 1/2007 | Campbell et al. | |
| 2008/0115701 A1 | 5/2008 | Sugiura | |
| 2009/0000522 A1 | 1/2009 | Collins et al. | |
| 2009/0007987 A1 | 1/2009 | Thomas et al. | |
| 2009/0283021 A1 | 11/2009 | Wong | |
| 2011/0283610 A1 | 11/2011 | Dinihanian | |
| 2011/0316212 A1 | 12/2011 | Jones et al. | |
| 2013/0285302 A1 | 10/2013 | Helm | |
| 2014/0231602 A1 * | 8/2014 | Lifshitz | F16M 11/04 |
| | | | 248/165 |

FOREIGN PATENT DOCUMENTS

| | | |
|---|---|---|
| DE | 20208317 | 9/2002 |
| DE | 102006024291 A1 | 11/2007 |
| EP | 0474935 | 3/1992 |
| EP | 474935 A1 | 11/1994 |
| EP | 1228790 A1 | 8/2002 |
| EP | 2140985 | 1/2010 |
| GB | 2050211 A | 1/1981 |
| GB | 1595523 A | 8/1981 |
| JP | 2008006541 A | 1/2008 |
| WO | 9304820 A1 | 3/1993 |

* cited by examiner

WORK BENCH FRAME

CROSS-REFERENCE TO RELATED APPLICATIONS

This is a continuation application of application Ser. No. 13/956,494, filed Aug. 1, 2013, which claims priority to EP Patent Application No. EP 13155483.4 filed Feb. 15, 2013, the contents thereof to be incorporated herein by reference in its entirety.

FIELD OF THE INVENTION

The present invention relates to portable work benches or tables which include an integral clamping table or vise. More particularly, the present invention relates to a work table with a clamping table or vise.

BACKGROUND OF THE INVENTION

Carpenters, woodworkers and handymen who work with wood as well as other materials, often need a work bench or table which may be utilized to hold workpieces. Ordinarily, these work benches include a metal frame and a table surface connected to the frame, the table surface including at least two substantially flat members. The table surface members are commonly made of wood or a similar material. One of the members is movably coupled with said frame in order to enable clamping of a workpiece between said members. The drive mechanism for moving the member may be operable using two hands, or even one hand. These tables may provide for secure clamping and may be versatile, compact and adjustable.

The frames of such work benches are often foldable, such that the table surface and frame can easily and safely be folded between an open, 'in-use' position and a compact, closed position. In the 'in-use' position, the table surface is supported by the frame in a substantially horizontal orientation and can be used in various ways, for example to support or to clamp a workpiece. In the closed position, the supporting frame is collapsed in order to make it easier for a user to carry the work bench in the closed position, and to minimize the space needed to store the work bench. The folding operation normally requires the user to activate one or more catches, which allows the frame to be folded or legs to be extended or collapsed in a number of stages. The folding operation is often difficult and awkward for the user due to the weight of the work bench itself and the movements that need to be made, and foreign objects may easily become trapped between hinged frame components. It is therefore desirable to provide an improved folding mechanism.

BRIEF SUMMARY OF THE INVENTION

The present invention provides an improved folding mechanism for a work bench. The frame is held in the 'in-use' position by one or more latched members that can be released in order to in order to allow the work bench to start folding under gravity. Once the work bench has started folding, the user simply causes the table surface to continue moving in the same way in order to completely fold the work bench. The work bench is unfolded by reversing the same movement.

In accordance with the present invention, there is provided a work bench comprising a frame foldable between an in-use position and a closed position, a table surface connected to the frame, said table surface including at least two members, at least one of said members movably coupled with said frame for enabling clamping of a workpiece between said members. The frame has two sides, left and right, which are connected to each other via a latchable bar and one or more fixed crossbars. Each of the two sides of the frame includes a bracket assembly supporting the table surface, a rear leg pivotally connected to the bracket assembly and a front leg pivotally connected to the bracket assembly. Each side also includes a bracket strut, one end of which is pivotally connected to the bracket assembly, wherein the bracket strut is connected closer to one end of the bracket assembly than both the rear leg and the front leg are; a rear strut, one end of which is pivotally connected to the rear leg; and a front strut, one end of which is pivotally connected to the front leg. The bracket strut, rear strut and front strut on the left side of the frame are pivotally connected to each other at a left main joint, and the bracket strut, rear strut and front strut on the right side of the frame are pivotally connected to each other at a right main joint. Both main joints are joined to the releasable crossbar, such that when the work bench is in the in-use position the latchable bar is latched to a component of the frame at a latched position and is releasable in order to allow both main joints to fall due to gravity.

The work bench frame may be folded from the in-use position into the fully closed position, preferably in one continuous movement. In the fully closed position, the table surface may be substantially parallel to the front and the rear legs. This may help to minimize the thickness of the work bench in the closed position, which makes the work bench easier to carry and minimizes the space required for storage.

The work bench may further comprise a movable catch, wherein the catch retains the latchable bar at the latched position while the work bench is in an in-use position, and wherein the latchable bar is releasable from the latched position by activation of the catch. The movable catch may be attached to one of the legs of the frame, or to the latchable bar. The movable catch may for example be a hook, which latches on to another part of the frame, and which is unhooked on activation.

The frame may also include at least one catch operable to latch the work bench in a closed position. Such a catch may also function as the movable catch that latches the work bench in the in-use position. Both of the two sides of the frame may comprise a similar movable catch, and may be arranged such that both movable catches must be activated in order to release the latchable bar. If both sides of the frame have a movable catch, they may be connected such that they can be activated at the same time.

One or both bracket struts may have an extension portion extending beyond the respective main joint, such that when the work bench is in the in-use position and the latchable bar is released, the extension portion moves in advance of the main joint towards a surface supporting the work bench. The extension portion may make contact with the support surface, and act as a foot for the work bench as it is moved into the closed position. Alternatively, the main joint or a part extending from the main joint, or a part of one of the struts, may make contact with the support surface and act as a foot for the work bench as it is moved into the closed position. Alternatively, another part of the work bench may act as a foot as the work bench is moved into the closed position, or the work bench may be supported only by the front leg and the user, as it is moved into the closed position.

On each side of the frame, the front leg, which is connected to the bracket assembly at its top end, may be provided at its bottom end with a foot having an angled front surface such that the work bench may be partially supported on the angled front surface when vertical in the closed position.

BRIEF DESCRIPTION OF THE DRAWINGS

The invention is herein described, by way of example only, with reference to the accompanying drawings, wherein.

Figure 1:
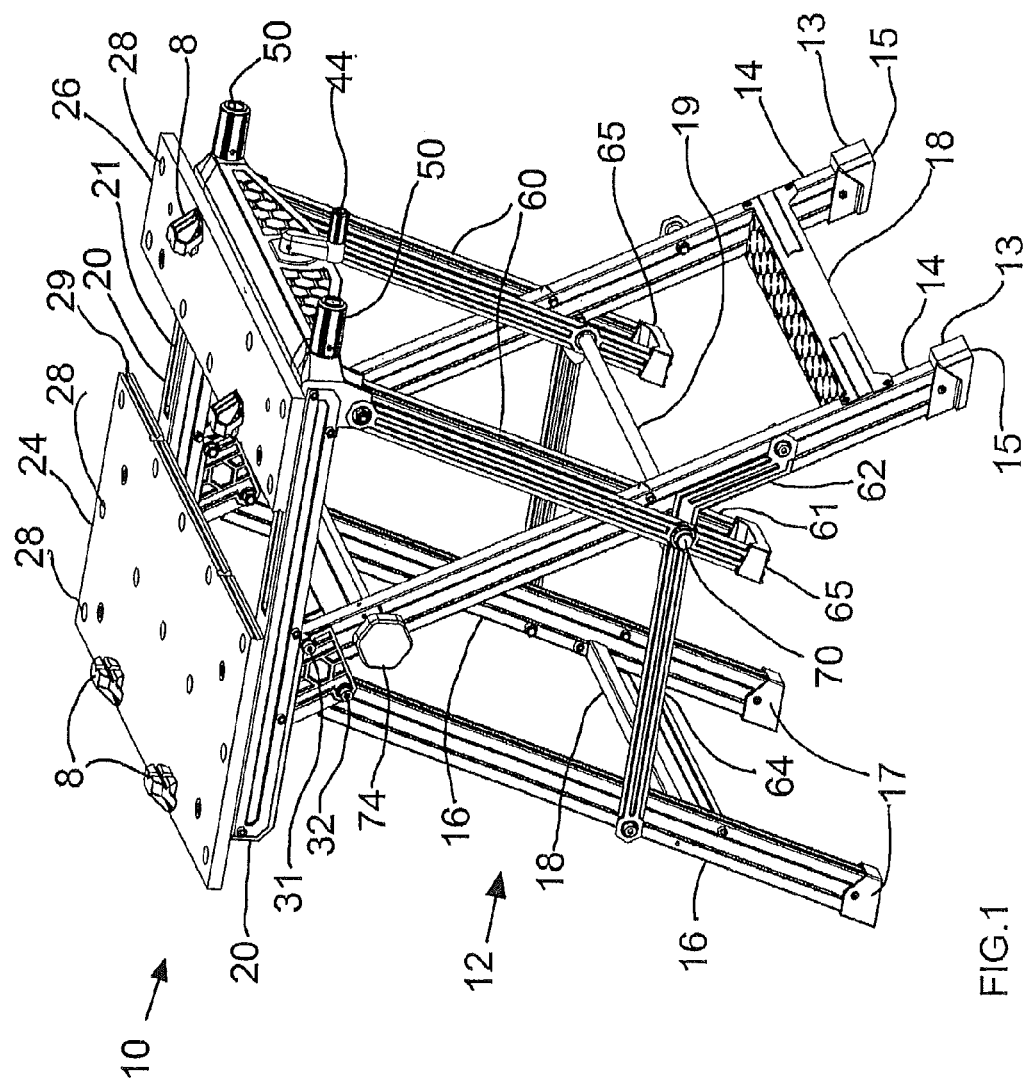
FIG. 1 is a perspective view of a work bench in accordance with the present invention, in an open 'in-use' position.

The preferred embodiment of the present invention is a work bench which is identified with the reference numeral 10. The work bench includes a frame structure 12 which has two sides, the two sides connected to each other with one or more crossbars 18 and a latchable bar 19. The work bench may be used in conjunction with one or more bracing pegs of various shapes, in order to brace a workpiece. The bracing pegs may be repositionable in a plurality of positions on the work bench, allowing bracing of workpieces of different sizes and shapes. The bracing pegs may be fitted to the work bench by any known method, including fitting into holes 28 or channels 29 in the top or sides respectively of a table surface member 24, 26. Four top pegs 8 are shown in FIG. 1. Elongated bracing pegs (not shown) may be slideably engaged in side channels 29 of a table surface member 24, 26. The side channels may be integrally formed in the table surface member or they may be formed of metal and attached to the table surface member. One or more bracing pegs may have a beveled or tapered shaft with a hooked base, in order to allow the peg to be easily inserted into a through-hole in a table surface member, and then retained securely therein by means of the hooked base bearing against the bottom surface of the table surface member.

Each side of the frame 12 includes a front leg 14, a rear leg 16 and a bracket assembly including a bracket 20, the bracket providing support for the table surface. The table surface comprises two members 24 and 26, one of which is movable with respect to the frame. As shown in FIG. 1, the brackets 18 may be spaced apart from each other, and are preferably positioned close to opposing outer side edges of the two table surface members 24 and 26, so that the brackets do not unnecessarily prevent sections of clamped workpieces from being able to protrude down in-between the two table surface members.

DETAILED DESCRIPTION OF THE INVENTION

In FIG. 1, the brackets include means to enable the fixed second table portion 26 to be fixed onto the brackets 20 by any suitable means, for example by a nut and bolt connection. The brackets 20 have a hollow portion with elongated slots 21 in the top surface, which enable movement of the movable table surface member 26 with respect to the brackets 20. An elongated screw is positioned within each bracket 20. The screws include a threaded portion which carries a threaded nut coupled with the movable table surface member 26 through the slot 21. The screws can be rotated by handles 44, 50 to force the threaded nuts to move along the screws, which causes the movable table surface member 26 to move laterally towards or away from the other table surface member 24, depending on the direction of rotation of the screws. In alternative embodiments, the table surface may be entirely fixed, and may include fixing points for power tools such as circular saws or the like.

The structure and function of one side of the frame will now be described, with the understanding that both sides of the frame are structured in a substantially identical way, and that each side moves in substantially the same way during opening and closing of the work bench. On each side of the frame 12, the rear leg 16 is pivotally connected to the bracket assembly at connection point 32 and the front leg 14 is pivotally connected to the same bracket assembly at connection point 31. Preferably, each leg 14, 16, is provided with a foot 13, 17, at its lower end. Each side of the frame further comprises a bracket strut 60, a front strut 62 and a rear strut 64. The front strut 62 has two ends, one of which is connected to the front leg 14, and one of which is connected at a main joint 70 to both the bracket strut 60 and the rear strut 64. The bracket strut 60 is pivotally connected to the bracket assembly near the front of the work bench 10, and to the other two struts at the main joint 70. The rear strut 64 is pivotally connected to the rear leg 16 and to the other two struts at the main joint 70.

Figure 4:
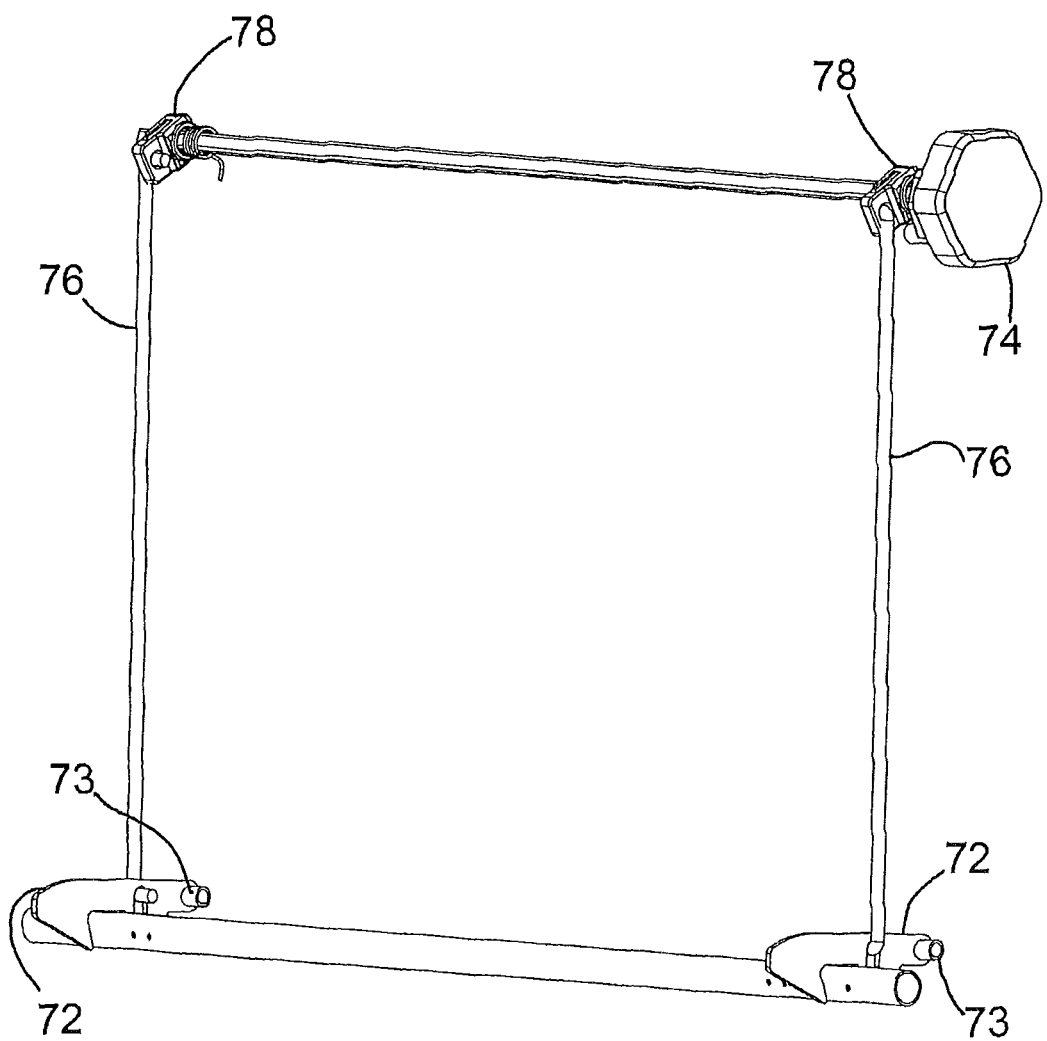
FIG. 4 is a view of an embodiment of the latching mechanism and latchable bar.

The latchable bar and the latching mechanism of the work bench of FIG. 1 are shown in FIG. 4 separated from the frame. In the embodiment shown, two movable catches 72 linked to the frame at pivot points 73, are each connected to an activator 74 via an articulated link comprising a bar 76 and a linkage 78. In this embodiment, the activator 74 is in the form of a handle and pole, the pole being attached to one linkage 78 near each end. The activator 74 is rotatably attached to the frame at the front legs 14, and the two bars 76 are each located within a channel of the respective front leg 14. When the work bench is in the in-use position, as shown in FIG. 1, the latchable bar 19 is latched close to the front legs 14 by the movable catches 72. Alternatively, the latching mechanism may include only one movable catch, and the activator and connection between the activator and the movable catch may be arranged differently. The activator may be directly linked a movable catch such that an articulated link is not required. Preferably, if more than one movable catch is present, they are all linked to and activated by one activator in order to avoid unequal stresses on the movable catches if one catch is released independently, although alternatively there may be one activator for each movable catch. The latching mechanism can be located at any suitable position on the frame in order to latch the latchable bar to a certain component of the frame, for example a back leg or a crossbar.

Figure 2:
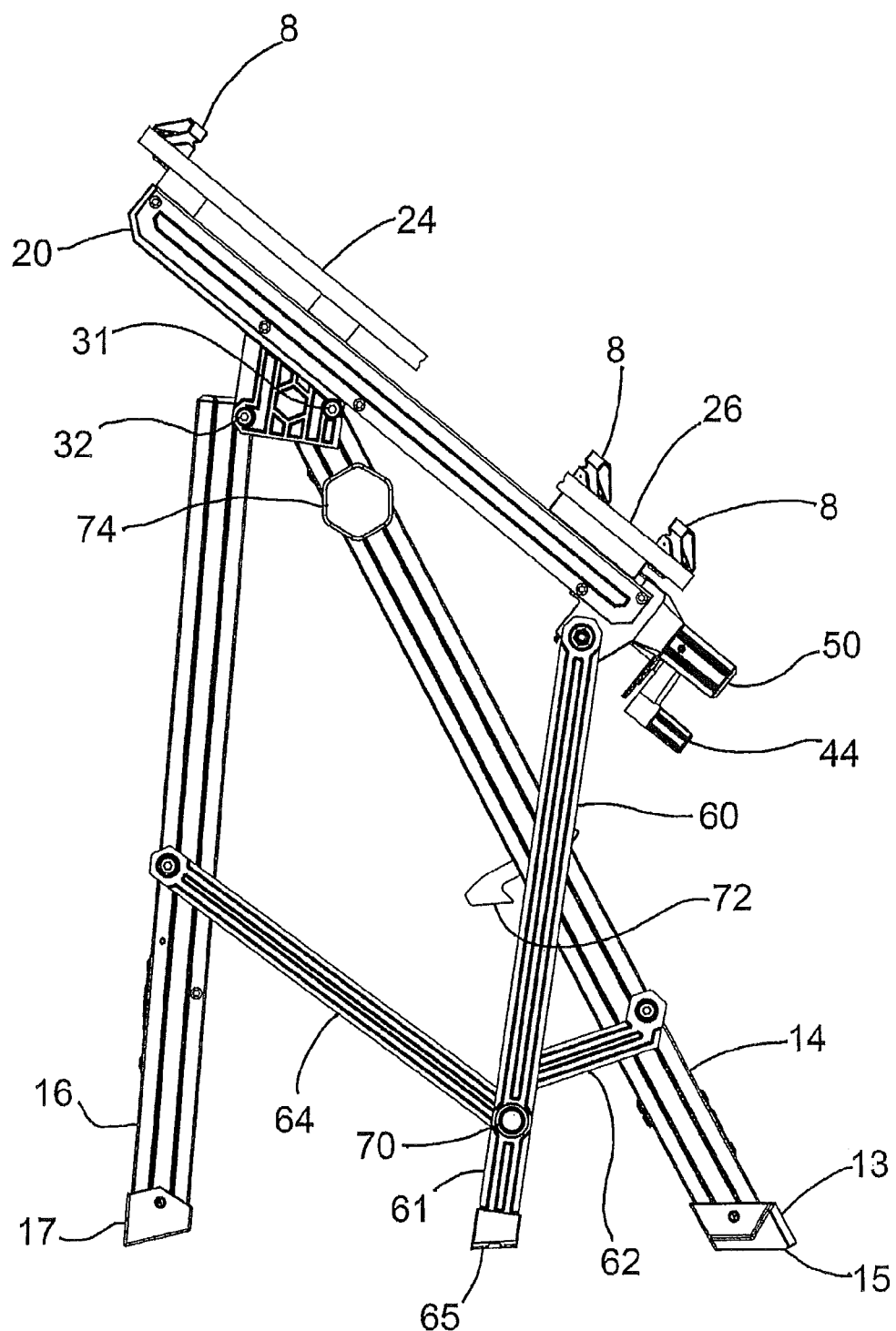
FIG. 2 is a side view of the work bench of FIG. 1 in a part-closed position.
Figure 3:
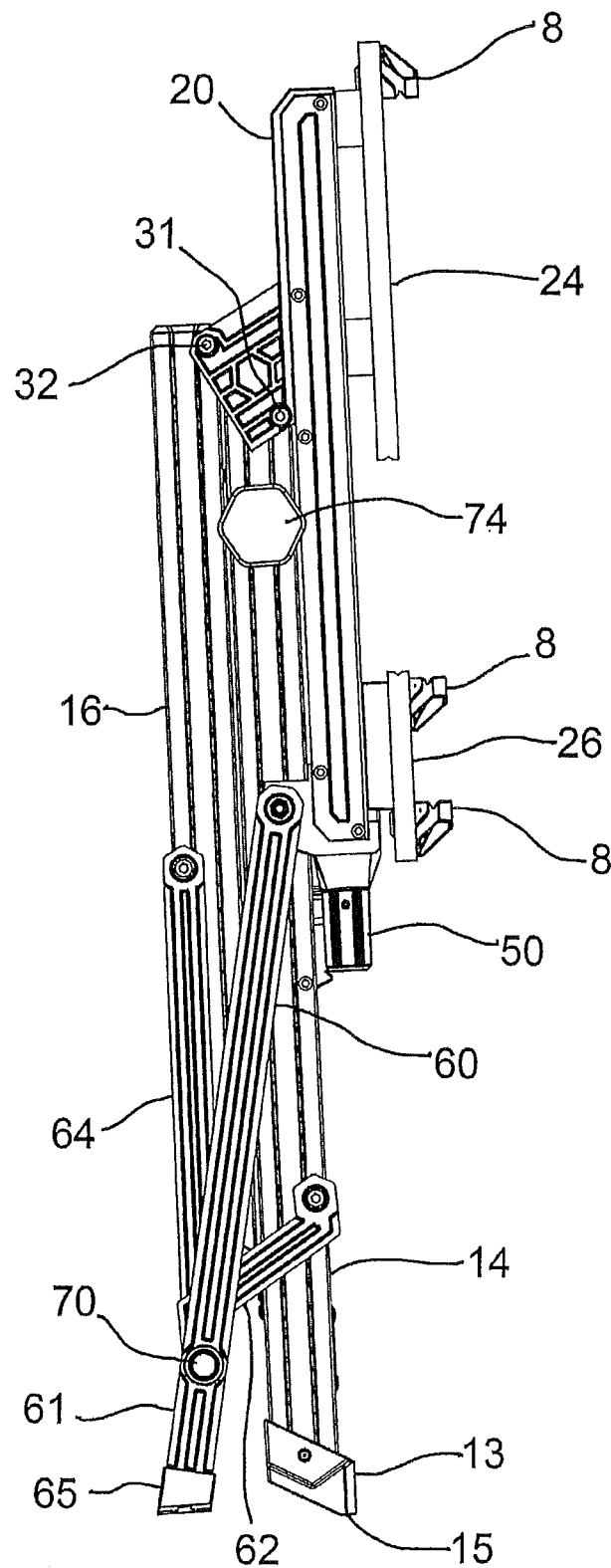
FIG. 3 is a side view of the work bench of FIG. 1 in a closed position.

In order to fold the work bench of FIG. 1 from the in-use position to the closed position, the activator 74 is turned to turn the movable catches 72 on their pivots and release the latchable bar 19. The latchable bar 19 and main joint 70 are then free to drop as shown in FIG. 2. One edge of the table surface rotates downwards and the opposite edge is elevated, so that the table surface is no longer substantially horizontal. The bracket strut has an elongated extension portion 61 at its lower end, which extends beyond the main joint 70 and is provided with a foot 65. The foot 65 drops until it reaches the surface on which the work bench is supported. In order to continue closing the work bench, the user continues to rotate the elevated edge of the table surface manually, causing the lower end of the rear leg 16 to be lifted such that the work bench is supported on the lower end of the front leg 14 and the lower end of the bracket strut 60, as shown in FIG. 3. Foot 13 has an angled toe 15, onto which the front foot can be tilted while the work bench is being closed and which the front foot may rest on when the work bench is closed.

Accidental activation of the folding mechanism can be avoided by the activator 74 requiring a pre-activation movement to be applied before it can be used to release the catches. For example, the activator may have a two-stage operation, so that it is necessary for the user to slightly move the activator horizontally, before it can be turned to release the catches. One way in which this can be achieved is to provide the activator with a pin which engages with another part of the frame to prevent the activator from turning until the activator is moved horizontally against a biasing spring or similar, in order to disengage the pin. Once the pin is disengaged, the activator can be turned in order to release the catches.

The work bench of FIG. 3 has a catch point on each rear leg 16, which is positioned to allow the movable latches 72 to engage with the catch points when the work bench is in a closed position, in order to prevent the work bench opening until a user activates the latching mechanism again. Alternatively, one or more separate catches which can operate directly by the user can be provided to secure the work bench in the closed position.

The bracket strut 60 may be connected to the bracket assembly at any point closer to one end of the bracket than the rear leg and front leg. In the embodiment shown in FIG. 1, the bracket strut 60 is connected to the bracket assembly close to its front, end, while both legs are connected close to its rear end, which arrangement provides good stability for use of the table surfaces in the in-use position, and permits the work bench to be relatively compact when in the folded closed position. As shown in FIG. 1, the connection points 31 and 32 of the front and rear legs respectively, are at different perpendicular distances below the substantially horizontal plane of the table surface when the work bench is in the in-use position. This allows the rear leg 16 to fold to be substantially parallel to the front leg 14, when the work bench is in the closed position, as shown in FIG. 3. The table surface is also substantially parallel to the front and rear legs when the work bench is in the closed position. The closed position is compact.

In order to open the work bench of FIGS. 1 to 3, the user stands the closed work bench in a vertical position, supported on at least one of the front leg 14 or the bracket strut 60, preferably both. The user then allows the elevated edge of the table surface to rotate downwards, until the lower end of the rear leg contacts the surface on which the work bench is supported. The user then rotates the lower edge of the table surface further, lifting the bracket strut and the main joint, until the latchable bar engages with the latching mechanism. Latches 72 are provided with angled profiles such that during the final stage of opening of the work bench, the latchable bar bears upon the latches and causes them to move and then to latch onto the latchable bar automatically, so that the user does not have to carry out any further steps in order to fix the work bench into the in-use position. In alternative embodiments, the user may need to actively engage the latches with the latchable bar.

When the present folding mechanism is activated to close the work bench, the closing process begins automatically, under the action of gravity. This makes the closing process easy for the user. It is also easy for the user to understand how to continue the closing process once the lower end of the front strut has contacted the surface on which the work bench is supported, since it is a smooth continuation of the same rotational movement of the table surface.

The table surface may be made of any suitable solid or laminated material, for example wood, bamboo, wood-like material or plastic. The frame structure is preferably made of metal, but could be made of any other suitably rigid material, for example, wood or reinforced plastic. The parts of the frame which contact the surface on which the work bench is supported, including the lower ends of the front and rear legs, and optionally the lower end of the bracket strut, may be provided with plastic or rubber feet in order to minimize slippage on the supporting surface on which the work bench is placed.

It should be understood that although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the claims.

The invention claimed is:

1. A work bench comprising:
    a frame foldable between an in-use position and a closed position;
    a table surface connected to the frame;
    wherein the frame comprises two sides, the two sides connected to each other with a latchable bar and one or more fixed crossbars;
    a movable catch which is movable from a position in which it retains the latchable bar at the latched position to thereby maintain the work bench in an in-use position, and a released position in which the latchable bar is released from the catch to thereby allow the work bench to be folded into a closed position;
    wherein the latchable bar and the one or more fixed crossbars are parallel to one another at least when the work bench is in the in-use position;
    wherein the latchable bar and the one or more fixed crossbars are not co-axial; and
    wherein an actuator for activating the catch is disposed remotely from the catch.

2. The work bench according to claim 1, wherein the latchable bar and the one or more fixed cross bars are spaced apart from one another.

3. The work bench according to claim 1, wherein the table surface includes at least two members, at least one of said members movably coupled to said frame for enabling clamping of a workpiece between said members.

4. A work bench comprising:
    a frame foldable between an in-use position and a closed position;
    a first table surface, the first table surface being configured to support a workpiece and being connected to the frame, the frame including a first side and a second side opposite the first side, the first side and the second side being connected to each other by a latchable bar and a fixed crossbar;
    a movable catch which is movable from a position in which it retains the latchable bar at the latched position to thereby maintain the work bench in an in-use position, and a released position in which the latchable bar is released from the catch to thereby allow the work bench to be folded into a closed position;
    wherein the first table surface extends from the first side to the second side and is moveable in a direction generally perpendicular to the fixed crossbar connecting the first side and the second side.

5. The work bench of claim 4, wherein the first table surface is generally flat.

6. The work bench of claim 5, wherein the first table surface is rectangular shaped.

7. The work bench of claim 6, further comprising a second table surface, the first table surface being movable with respect to the first table surface.

8. The work bench of claim 4, wherein the latchable bar and the fixed crossbar are parallel to one another at least when the work bench is in the in-use position.

9. The work bench of claim 4, wherein an actuator for activating the catch is disposed remotely from the catch.

10. The work bench according to claim 4, wherein the movable catch moves toward the first table member when it moves from the position in which it retains the latchable bar at the latched position to the released position in which the latchable bar is released from the catch.

11. The work bench of claim 4, wherein the latchable bar and the one or more fixed crossbars are parallel to one another at least when the work bench is in the in-use position; and
    wherein the latchable bar and the one or more fixed crossbars are not co-axial.

12. A work bench comprising:
    a frame foldable between an in-use position and a closed position;
    a first table surface, the first table surface being configured to support a workpiece and being connected to the frame, the frame including a first side and a second side opposite the first side, the first side and the second side being connected to each other by a latchable bar and a fixed crossbar;
    a movable catch which is movable from a position in which it retains the latchable bar at the latched position to thereby maintain the work bench in an in-use position, and a released position in which the latchable bar is released from the catch to thereby allow the work bench to be folded into a closed position;
    wherein the first table surface extends from the first side to the second side; and
    wherein the movable catch moves toward the first table member when it moves from the position in which it retains the latchable bar at the latched position to the released position in which the latchable bar is released from the catch; and
    further comprising a second table surface, the first table surface being movable with respect to the second table surface.

13. The work bench of claim 12, wherein the first table surface is moveable in a direction generally perpendicular to the fixed crossbar connecting the first side and the second side.

14. The work bench of claim 12, wherein the first table surface is generally flat and rectangular shaped.

15. The work bench of claim 12, wherein the latchable bar and the one or more fixed crossbars are parallel to one another at least when the work bench is in the in-use position; and
    wherein the latchable bar and the one or more fixed crossbars are not co-axial.

16. The work bench of claim 12, wherein an actuator for activating the catch is disposed remotely from the catch.

17. The work bench according to claim 12, wherein the movable catch comprises a first hook which latches a first end of the latchable bar and a second hook which latches a second end of the latchable bar.

* * * * *